(12) United States Patent
Lee

(10) Patent No.: US 9,099,245 B2
(45) Date of Patent: Aug. 4, 2015

(54) MULTILAYER CERAMIC ELECTRONIC COMPONENT

(71) Applicant: SAMSUNG ELECTRO-MECHANICS CO., LTD., Suwon, Gyunggi-do (KR)

(72) Inventor: Chang Ho Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 212 days.

(21) Appl. No.: 13/745,094

(22) Filed: Jan. 18, 2013

(65) Prior Publication Data

US 2013/0250472 A1    Sep. 26, 2013

(30) Foreign Application Priority Data

Mar. 13, 2012    (KR) .................. 10-2012-0025783

(51) Int. Cl.
| | |
|---|---|
| H01G 4/30 | (2006.01) |
| H01G 4/005 | (2006.01) |
| H01G 4/228 | (2006.01) |
| H01G 4/12 | (2006.01) |
| H01G 4/012 | (2006.01) |
| H01G 4/232 | (2006.01) |

(52) U.S. Cl.
CPC ................ *H01G 4/12* (2013.01); *H01G 4/012* (2013.01); *H01G 4/232* (2013.01); *H01G 4/30* (2013.01); *H01G 4/2325* (2013.01)

(58) Field of Classification Search
CPC ........... H01G 4/30; H01G 4/232; H01G 4/06; H01G 4/012

USPC ............................ 361/303, 311, 301.4, 306.3
See application file for complete search history.

(56) References Cited

U.S. PATENT DOCUMENTS

| | | | |
|---|---|---|---|
| 8,713,770 B2 * | 5/2014 | Prymak ...................... 29/25.41 |
| 2008/0030923 A1 * | 2/2008 | Maxwell .................... 361/306.3 |
| 2008/0174931 A1 * | 7/2008 | Skamser et al. ............. 361/272 |
| 2009/0052112 A1 * | 2/2009 | Bultitude et al. ............ 361/303 |
| 2010/0097739 A1 * | 4/2010 | Prymak ...................... 361/301.4 |

FOREIGN PATENT DOCUMENTS

| | | |
|---|---|---|
| JP | 8-107039 A | 4/1996 |
| JP | 2007-067239 A | 3/2007 |
| JP | 2011-091199 A | 5/2011 |

\* cited by examiner

*Primary Examiner* — Eric Thomas
(74) *Attorney, Agent, or Firm* — McDermott Will & Emery LLP

(57) ABSTRACT

A multilayer ceramic electronic component includes a ceramic main body having internal and floating electrode layers laminated therein and spaced apart from each other; and external electrodes formed on ends of the ceramic main body and including a first layer including a conductive metal and a second layer formed on the first layer and including a conductive resin. When Tc is thickness of a cover layer, G is gap between internal electrodes, L1 is length from either end of the ceramic main body in a length direction thereof to an end of the first layer formed on the upper or lower surface of the ceramic main body, Te is thickness of the internal electrode, Td is distance between internal and floating electrode layers, Lm is length of a margin part of the floating electrode layer, and L is length of the ceramic main body, $Tc \leq 80$ μm, $(1.5)Lm \leq G \leq (L-2Lm)$, and $L1 < Lm+(Tc+Te+Td) \times \cot 50°$ are satisfied.

12 Claims, 2 Drawing Sheets

X-X'

X-X'

MULTILAYER CERAMIC ELECTRONIC COMPONENT

CROSS-REFERENCE TO RELATED APPLICATIONS

This application claims the priority of Korean Patent Application No. 10-2012-0025783 filed on Mar. 13, 2012, in the Korean Intellectual Property Office, the disclosure of which is incorporated herein by reference.

BACKGROUND OF THE INVENTION

1. Field of the Invention

The present invention relates to a multilayer ceramic electronic component, and more particularly, to a multilayer ceramic electronic component having excellent reliability.

2. Description of the Related Art

In electronic components for use in industrial electronic devices, defects such as warpage, cracks, and the like, may cause lack of functionality therein, and thus, reliability is important. In order to prevent the occurrence of cracks, a technique of forming a portion of an external electrode with a conductive resin layer has been introduced.

However, even in the case in which a portion of the external electrode is formed of the conductive resin layer, a cover layer needs to be thinner, as products tend to have ever-higher capacitances. The thinner cover layer may lead to the possibility of cracks occurring in electronic components when a substrate warps after the mounting of the electronic components on the substrate.

In the area of electronic components for use in industrial electronic devices, in which product reliability is considered important, even in the case in which cracks occur due to substrate warping, it is necessary to prevent cracks from negatively affecting electronic component performance.

RELATED ART DOCUMENTS (Patent Document 1) Japanese Patent Laid-Open Publication No. 2007-067239
(Patent Document 2) Japanese Patent Laid-Open Publication No. 1996-107039

SUMMARY OF THE INVENTION

An aspect of the present invention provides a multilayer ceramic electronic component having excellent reliability.

According to an aspect of the present invention, there is provided a multilayer ceramic electronic component, including: a ceramic main body having internal electrode layers and floating electrode layers laminated therein and spaced apart from each other, each internal electrode layer including internal electrodes spaced apart from each other and each floating electrode layer including floating electrodes spaced apart from each other; and external electrodes formed on both ends of the ceramic main body, extended to portions of upper and lower surfaces of the ceramic main body, each external electrode including a first layer including a conductive metal and a second layer formed on the first layer and including a conductive resin, wherein, when Tc is a thickness of a cover layer of the ceramic main body, G is a gap between the internal electrodes of the internal electrode layer, L1 is a length from either end of the ceramic main body in a length direction thereof to an end of the first layer formed on the upper or lower surface of the ceramic main body, Te is a thickness of the internal electrode, Td is a distance between the internal electrode layer and the floating electrode layer, Lm is a length of a margin part of the floating electrode layer in the length direction thereof, and L is a length of the ceramic main body, $Tc \leq 80$ μm, $(1.5)Lm \leq G \leq (L-2Lm)$, and $L1 < Lm+(Tc+Te+Td) \times \cot 50°$ are satisfied.

The multilayer ceramic electronic component may be 1005-sized or greater.

When L2 is a length from either end of the ceramic main body in the length direction thereof to an end of the second layer formed on the upper or lower surface of the ceramic main body, $(1.5)L1 \leq L2 \leq (1/3)L$ may be satisfied.

The internal electrodes and the floating electrodes may have a rectangular shape.

The internal electrodes and the floating electrodes may be formed of the same material.

The conductive resin may include at least one selected from the group consisting of a silver (Ag)-epoxy resin, a copper (Cu)-epoxy resin, and a copper (Cu)-coated silver (Ag) resin.

According to an aspect of the present invention, there is provided a multilayer ceramic electronic component, including: a ceramic main body having internal electrode layers and floating electrode layers laminated therein and spaced apart from each other, each internal electrode layer including internal electrodes spaced apart from each other and each floating electrode layer including floating electrodes spaced apart from each other; and external electrodes formed on both ends of the ceramic main body, extended to portions of upper and lower surfaces of the ceramic main body, each external electrode including a first layer including a conductive metal and a second layer formed on the first layer and including a conductive resin, wherein, when Tc is a thickness of a cover layer of the ceramic main body, G is a gap between the internal electrodes of the internal electrode layer, L1 is a length from either end of the ceramic main body in a length direction thereof to an end of the first layer formed on the upper or lower surface of the ceramic main body, L2 is a length from either end of the ceramic main body in the length direction thereof to an end of the second layer formed on the upper or lower surface of the ceramic main body, Te is a thickness of the internal electrode, Td is a distance between the internal electrode layer and the floating electrode layer, Lm is a length of a margin part of the floating electrode layer in the length direction thereof, and L is a length of the ceramic main body, $Tc \leq 80$ μm, $(1.5)Lm \leq G \leq (L-2Lm)$, $(1.5)L1 \leq L2 \leq (1/3)L$ are satisfied.

The multilayer ceramic electronic component may be 1005-sized or greater.

The multilayer ceramic electronic component may satisfy $L1 < Lm+(Tc+Te+Td) \times \cot 50°$.

The internal electrodes and the floating electrodes may have a rectangular shape.

The internal electrodes and the floating electrodes may be formed of the same material.

The conductive resin may include at least one selected from the group consisting of a silver (Ag)-epoxy resin, a copper (Cu)-epoxy resin, and a copper (Cu)-coated silver (Ag) resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
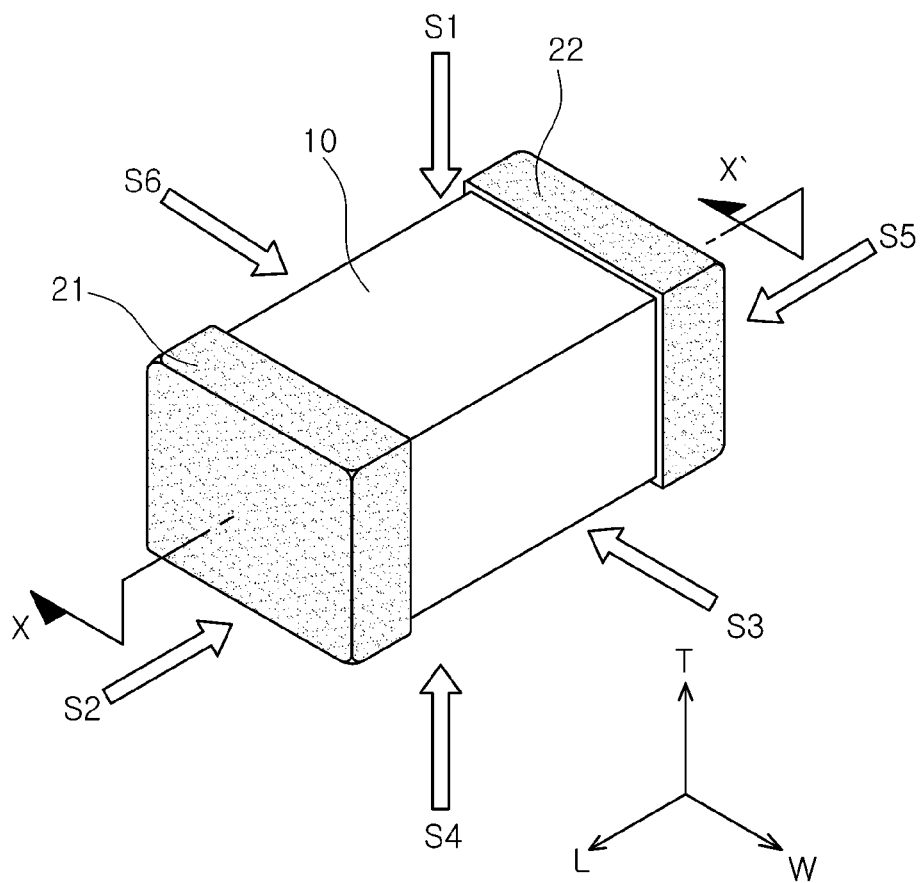
FIG. 1 is a perspective view of a multilayer ceramic electronic component according to an embodiment of the present invention.

Embodiments of the present invention will now be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
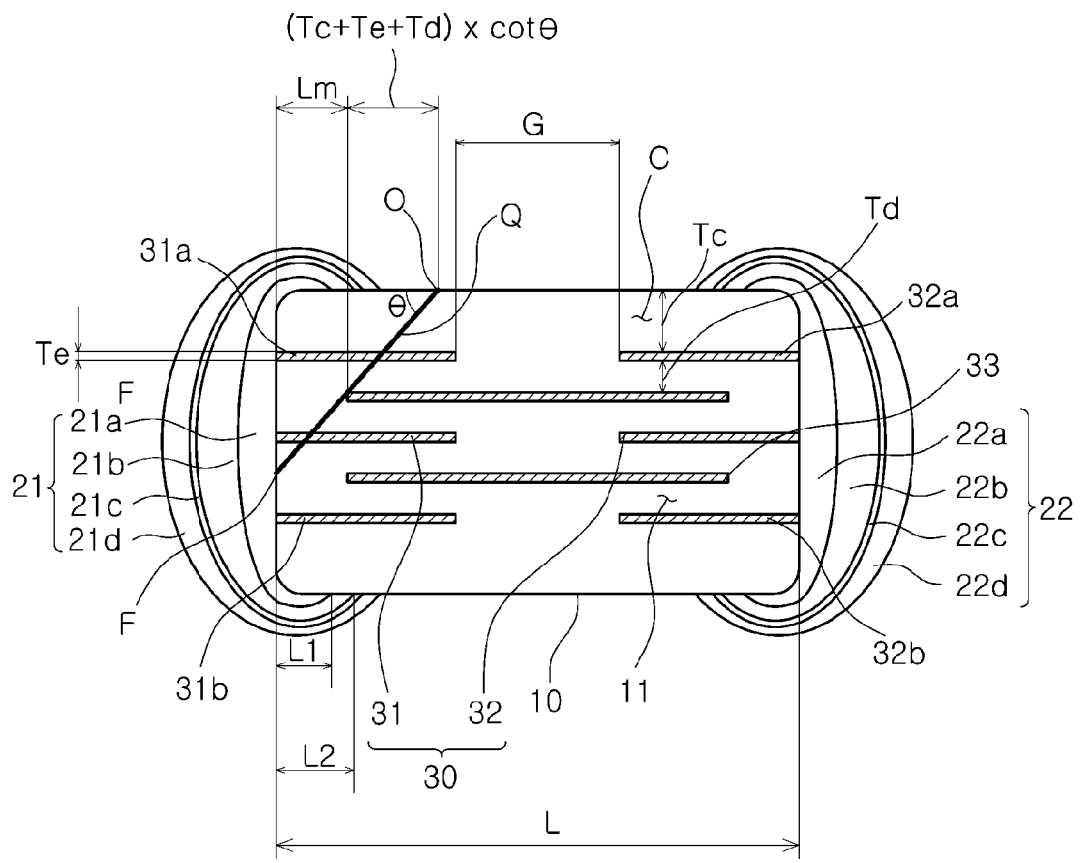
FIG. 2 is a cross-sectional view taken along line X-X' of FIG. 1.

FIG. 1 is a perspective view of a multilayer ceramic electronic component according to an embodiment of the present invention. FIG. 2 is a cross-sectional view taken along line X-X' of FIG. 1.

Referring to FIGS. 1 and 2, a multilayer ceramic electronic component according to an embodiment of the present invention may include a ceramic main body 10, internal electrodes 30 laminated on the inside of the ceramic main body 10, and external electrodes 21 and 22 formed on the outside of the ceramic main body 10.

The ceramic main body 10 may have a parallelpiped shape. The terms, "length direction", "width direction", and "thickness direction" may be designated by "L direction", "W direction", and "T direction" in FIG. 1, respectively. Here, the thickness direction may refer to a direction in which the internal electrodes are laminated.

As for the ceramic main body 10, the length thereof is larger than the width thereof and the thickness thereof may be equal to the width thereof. The ceramic main body 10 may have an upper surface S1, a lower surface S4, side surfaces S3 and S6, and end surfaces S2 and S5.

The ceramic main body 10 may include a dielectric material having a high dielectric constant, and may specifically include barium titanate or strontium titanate, without being limited thereto.

Since the dielectric material is electrically dipolar, it may store a larger electrical charge.

An area from the upper surface S1 to an uppermost internal electrode 31a in the ceramic main body 10 may be designated as a cover layer C. Also, an area from the lower surface S4 to a lowermost internal electrode 32a in the ceramic main body 10 may be also designated as a cover layer C.

Internal electrode layers and floating electrode layers may be laminated within the ceramic main body 10 while they are spaced apart from each other. Also, the internal electrode layers may be disposed on the outermost portion of the ceramic main body in the thickness direction thereof. Also, the internal electrode layers and the floating electrode layers may be alternately laminated.

The internal electrode layer may include first and second internal electrodes 31 and 32. Here, the first and second internal electrodes 31 and 32 may be disposed on the same layer while being spaced apart from each other with a gap G therebetween.

In addition, the internal electrode layer may further include a first floating electrode 33 between the first and second internal electrodes 31 and 32.

The first internal electrode 31 may be connected to a first external electrode 21, and the second internal electrode 32 may be connected to a second external electrode 22. The first and second internal electrodes 31 and 32 may have a rectangular shape.

The floating electrode layer may include second floating electrodes 34 and 35 that are not electrically connected to the external electrodes 21 and 22. The first and second floating electrodes 33, 34 and 35 may have a rectangular shape.

The internal electrodes 31 and 32 and the first and second floating electrodes 33, 34, and 35 may include at least one selected from the group consisting of gold, silver, copper, nickel, palladium, platinum, and alloys thereof, but is not limited thereto. Any material may be used therefor without particular limitation so long as it can impart sufficient conductivity to the internal electrodes 31 and 32 and the first and second floating electrodes 33, 34, and 35.

Gold, silver, palladium, platinum, and the like are noble metals and are thus relatively expensive, but chemically stable. Nickel, copper, and the like are base metals, and are thus relatively cheap. However, since they are easily oxidizable during a sintering procedure, a reducing atmosphere may be necessary for the sintering procedure.

The internal electrodes 31 and 32 and the first and second floating electrodes 33, 34, and 35 may be formed of the same material. In this case, the internal electrodes 31 and 32 and the first and second floating electrodes 33, 34, and 35 have the same electrical characteristics, and thus, stable capacitance may be realized. In addition, there is no need to separately manufacture the internal electrodes 31 and 32 and the first and second floating electrodes 33, 34, and 35, whereby manufacturing time and manufacturing costs may be reduced.

The external electrodes may be formed on both end surfaces of the ceramic main body 10, and extended to portions of the upper and lower surfaces of the ceramic main body 10. The external electrodes may include the first and second external electrodes 21 and 22. Electric currents having opposite polarities may be applied to the first and second external electrodes 21 and 22. The first external electrode 21 may include first and second layers 21a and 21b, and the second external electrode 22 may include first and second layers 22a and 22b.

The first layers 21a and 22a may be formed on the ceramic main body 10, and may be formed of metal.

The first layers 21a and 22a may be directly connected to the internal electrodes 31 and 32. A metal constituting the first layers 21a and 22a and a metal constituting the internal electrodes 31 and 32 may form an alloy at connection portions therebetween. Hereby, the external electrodes 21 and 22 may be strongly connected to the internal electrodes 31 and 32.

The first layers 21a and 22a may be formed by using a conductive paste including conductive metals and glass frit, but are not limited thereto. Here, the conductive metal may include at least one selected from the group consisting of gold, silver, palladium, copper, nickel, and alloys thereof.

Since the first layers 21a and 22a are formed of metal or glass, the first layers 21a and 22a are vulnerable to external impacts. Since metal and glass have a low degree of toughness, the external electrodes 21 and 22 may be disconnected from the internal electrodes 31 and 32 due to external impacts.

The second layers 21b and 22b may be formed on the first layers 21a and 22a, respectively, and may include a conductive resin.

The conductive resin may include at least one selected from the group consisting of a silver (Ag)-epoxy resin, a copper (Cu)-epoxy resin, and a copper (Cu)-coated silver (Ag) resin. That is, the conductive resin may be prepared by using a paste including an epoxy resin and at least one selected from the group consisting of silver (Ag) powder, copper (Cu) powder, and copper (Cu)-coated silver (Ag) powder.

The silver (Ag) powder or the copper (Cu) powder may impart conductivity to the second layers 21b and 22b. Any material may be used therefor without particular limitation so long as it can impart conductivity to the second layers 21b and 22b.

The epoxy resin may impart elasticity to the second layers 21b and 22b. The epoxy resin may absorb external impacts applied thereto, and thus, impact resistance thereof may be improved.

The first external electrode 21 may include first and second plating layers 21c and 21d, and the second external electrode 22 may include first and second plating layers 22c and 22d. The first plating layers 21c and 22c and the second plating layers 21d and 22d may be formed for ease of mountability.

The first plating layers 21c and 22c may be formed on the second layers 21b and 22b, respectively, and the second plating layers 21d and 22d may be formed on the first plating layers 21c and 22c, respectively. The first plating layers 21c and 22c may be nickel plating layers, and the second plating layers 21d and 22d may be tin plating layers.

Hereinafter, a situation in which cracks occur in portions of the ceramic main body in which the internal electrodes are connected to the external electrodes will mainly be described.

According to the present embodiment, even in the case in which cracks occur in the connection portions of the internal and external electrodes of the ceramic main body, product performance may not be affected thereby.

In the present embodiment, each cover layer C of the ceramic main body 10 may have a thickness Tc of 80 μm or less.

The cover layer C of the ceramic main body 10 may range from the upper surface S1 or the lower surface S4 of the ceramic main body 10 to the outermost internal electrodes 31a, 32a, 31b, and 32b.

The thickness Tc of the cover layer C may be an average value obtained by measuring thicknesses at 10 equidistant points on the cover layer C, extracted from an image obtained by scanning a cross section of a central portion of the ceramic main body 10 taken in the length and thickness directions thereof with a scanning electron microscope, and then averaging the measured thicknesses.

The central portion of the ceramic main body 10 may be equivalent to a region within 45% of the total width of the ceramic main body 10 in both directions outwardly of the center of the ceramic main body 10 in the width direction (W direction) thereof. The thickness Tc of the cover layer may have a stable value within the above range.

When Tc exceeds 80 μm, warping and cracks do not occur, since the cover layer C is relatively thick. As the multilayer ceramic electronic component is highly laminated and thus has increased capacitance, the thickness Tc of the cover layer may be reduced to 80 μm or less, which may cause warping and cracks.

The embodiment of the present invention is provided to solve cracks occurring when the thickness Tc of the cover layer is 80 μm or less and defects occurring due to the cracks.

In the present embodiment, $(1.5)Lm \leq G \leq (L-2Lm)$ may be satisfied.

That is, the gap G between the internal electrodes 31 and 32 on the internal electrode layer may be equal to or greater than 1.5 times a length Lm of a margin part of the floating electrode layer in the length direction thereof, but may be equal to or smaller than a value obtained by subtracting a value equal to 2 times the length Lm of the margin part of the floating electrode layer in the length direction thereof from a length L of the ceramic main body.

If $G<(1.5)Lm$, the gap G between the first and second internal electrodes 31 and 32 is excessively small, and thus, flashover may occur between the first and second internal electrodes 31 and 32.

If $G>(L-2Lm)$, overlapping areas between the first and second internal electrodes 31 and 32 and the second floating electrodes 34 and 35 are relatively small, and thus, desired capacitance may be difficult to realize.

In the present embodiment, $L1<Lm+(Tc+Te+Td) \times \cot 50°$ may be satisfied.

That is, a length L1 from either end of the ceramic main body 10 in the length direction thereof to an end of each of the first layers 21a and 22a formed on the upper surface S1 or the lower surface S4 of the ceramic main body 10 may be smaller than a value obtained by multiplying the sum of the thickness Tc of the cover layer C of the ceramic main body 10, a thickness Te of the internal electrode and a distance Td between neighboring internal electrodes by cot 50° and adding the length Lm of the margin part of the floating electrode layer in the length direction thereof.

This takes into consideration the relationship of a crack Q and the second floating electrodes.

The occurrence of cracks may be prevented or reduced by forming the second layers 21b and 22b made of a conductive resin in the external electrodes. Even in the case in which cracks occur, if $L1<Lm+(Tc+Te+Td) \times \cot 50°$, short circuits may not occur, and thus product performance may not be affected thereby.

This fail safe mode may be particularly required in industrial electronic devices requiring reliability.

Cracks may occur at the end of the first layer 21a of the external electrode made of metal. This is due to the fact that stress is concentrated on the end of the first layer 21a since the first layer 21a is made of metal such that the first layer 21a has a high level of hardness and a low capability to absorb impacts.

The crack may start from the end of the first layer, proceed inside the ceramic main body 10, and terminate at an interface F with the first layer.

FIG. 2 shows the case in which cracks have occurred, exaggerating the case in which short circuits may occur regardless of crack occurrence starting points.

The crack may be formed in an almost linear manner, and may make a predetermined angle θ with the upper surface S1 of the ceramic main body 10. The angle of the crack with the upper surface S1 of the ceramic main body 10 may be designated as a crack angle. Here, the crack angle may be about 50°.

Referring to FIG. 2, the crack Q penetrates the uppermost first internal electrode 31a, and then intersects the second floating electrode 34. The uppermost first internal electrode 31a and the second floating electrode 34 may be electrically connected to each other due to the crack Q.

Floating electrodes are used in high-voltage products in order to reduce a level of voltage substantially applied to the internal electrodes and increase overall voltage by an amount equal to a reduction in voltage load on the internal electrodes.

However, in the case in which the uppermost first internal electrode and the floating electrode are electrically connected to each other due to the crack, the voltage reduction effect may not be present, and rather, a high level of voltage may travel between the first and second internal electrodes in a substantially unchanged manner.

For this reason, electronic component deteriorations may be increased and electronic component lifespan may be shortened, resulting in degradations in reliability of electronic products.

L1 needs to be smaller than $Lm+(Tc+Te+Td) \times \cot 50°$ so that, the crack does not intersect the second floating electrode 34 even in the case that the crack occurs to penetrate the uppermost internal electrode 31a, and thus short circuits may not occur.

If L1 is greater than $Lm+(Tc+Te+Td) \times \cot 50°$, the crack Q, penetrating the uppermost internal electrode 31a, intersects or penetrates the second floating electrode 34, and thus, the floating electrode may not properly function. For this reason, product reliability may be degraded.

The thickness Tc of the cover layer of the ceramic main body, the thickness Te of the internal electrode, and the distance Td between the internal electrodes may be average values.

They may each be an average value obtained by measuring values at 10 equidistant points on the image obtained by scanning the cross section of the central portion of the ceramic main body taken in the length and thickness directions using a scanning electron microscope, and then averaging the measured values.

The central portion of the ceramic main body 10 may be equivalent to a region within 45% of the total width of the ceramic main body 10 in both directions outwardly of the center of the ceramic main body 10 in the width direction (W direction) thereof. The thickness Tc of the cover layer of the ceramic main body, the thickness Te of the internal electrode, and the distance Td between the internal electrodes may have stable values within the above range.

In the embodiment of the present invention, when Tc≤80 μm, (1.5)Lm≤G≤(L−2Lm), and L1<Lm+(Tc+Te+Td)×cot 50° are satisfied, and L2 is a length from either end of the ceramic main body 10 in the length direction thereof to an end of each of the second layers 21b and 22b formed on the upper surface S1 or the lower surface S4 of the ceramic main body 10, (1.5)L1≤L2≤(⅓)L may be satisfied.

The characteristics of (1.5)L1≤L2≤(⅓)L will be described in detail in another embodiment of the present invention below.

In the embodiment of the present invention, (1.5)L1≤L2≤(⅓)L may be satisfied.

That is, the length L2 from either end of the ceramic main body 10 in the length direction thereof to the end of each of the second layers 21b and 22b formed on the upper surface S1 or the lower surface S4 of the ceramic main body 10 may be equal to or greater than 1.5 times the length L1 from either end of the ceramic main body 10 in the length direction thereof to the end of each of the first layers 21a and 22a formed on the upper surface S1 or the lower surface S4 of the ceramic main body 10, and may be ⅓ or less of the length L of the ceramic main body 10.

If L2<(1.5)L1, the occurrence of the crack Q may not be prevented or reduced. The reason is that the contact area of the second layers 21b and 22b and the ceramic main body 10 is relatively small, and thus the second layers 21b and 22b cannot sufficiently absorb the stress present in the ceramic main body 10.

The occurrence of the crack Q can be prevented or reduced in the ceramic main body 10, by allowing the second layers 21b and 22b to absorb stress that may be present in the ceramic main body 10 and induce the occurrence of the crack Q. Therefore, since the contact area of the second layers 21b and 22b and the ceramic main body 10, that is, the route for absorbing the stress is narrow, the occurrence of the crack Q cannot be prevented or reduced in the ceramic main body 10.

If L2>(⅓) L, flashover may occur. In the case in which the distance between the first and second external electrodes 21 and 22 to which electric currents having opposite polarities are applied is short to thereby exceed the withstand voltage strength of air, insulation breakdown of air may occur, which may cause flashover.

In the present embodiment, the multilayer ceramic electronic component may be 1005-sized or greater.

1005 size may be (1.0±0.15 mm)×(0.5±0.05 mm).

Hereinafter, the present invention will be described in detail, with reference to inventive examples and comparative examples.

A multilayer ceramic capacitor according to the each inventive example was manufactured as follows.

A barium titanate powder, ethanol as an organic solvent, and polyvinylbutyral as a binder were mixed, followed by ball milling, thereby preparing a ceramic slurry. Ceramic green sheets were produced by using the ceramic slurry.

A conductive paste for an internal electrode containing nickel was printed on the ceramic green sheets, to form internal electrodes thereon. The resultant sheets were laminated to produce a green laminate, and the green laminate was then subjected to isostatic pressing with a pressure of 1,000 kgf/cm² at 85° C.

The compressed green laminate was cut into green chips, and the cut green chips were then subjected to a debindering process in which they were maintained at a temperature of 230° C. under an air atmosphere for 60 hours. The green chip was sintered at 950° C., to produce a sintered chip. The sintering process was performed under a reducing atmosphere to prevent oxidation of the internal electrodes. The reducing atmosphere was set to $10^{-11} \sim 10^{-10}$ atm, lower than the Ni/NiO equilibrium oxygen partial pressure.

First layers were formed on outer surfaces of the sintered chip by using a first paste including a copper powder and a glass powder.

Second layers formed of a conductive resin were formed to cover the first layers, respectively, by using a second paste. A paste containing epoxy, silver (Ag), and a hardening agent was used as the second paste, and then the second layers were cured by applying heat thereto.

Nickel and tin plating layers were sequentially formed on each of the second layers, respectively, through electroplating.

First, in order to investigate whether or not cracks occur as the thickness of a cover layer is decreased, a multilayer ceramic capacitor sample in which the thickness of the cover layer was varied was manufactured. The sample was mounted on a substrate, and then a warpage test was performed thereupon. After the test, a cross section of the sample was inspected with a high-resolution microscope to confirm the occurrence or non-occurrence of cracks.

In the warpage test, it was determined whether or not the sample was defective or not according to the change in capacitance by mounting the sample on the substrate and applying weight to a rear surface of the substrate on which the sample was mounted for 5 seconds.

The substrate was pressed to be deformed by 3 mm for Class 1 and 2 mm for Class 2, and the reference for determining warping strength was set as a range of ±10% of an initial capacitance value.

TABLE 1

| | Tc (um) | L (um) | Lm (um) | G (um) | 1.5Lm (um) | L−2Lm (um) | Number of Cracks |
|---|---|---|---|---|---|---|---|
| 1 | 90 | 1400 | 100 | 120 | 150 | 1200 | 0/100 |
| 2 | 85 | 1400 | 100 | 120 | 150 | 1200 | 0/100 |
| 3 | 80 | 1400 | 100 | 120 | 150 | 1200 | 76/100 |
| 4 | 75 | 1400 | 100 | 120 | 150 | 1200 | 81/100 |
| 5 | 70 | 1400 | 100 | 120 | 150 | 1200 | 83/100 |

Referring to Table 1, it can be confirmed that cracks occurred as the thickness of the cover layer was reduced to 80 μm or less while deviating from the numerical range of the present invention. The object of the present invention is to solve the problem of cracks occurring as the thickness of the cover layer is reduced to 80 μm or less.

In order to determine an appropriate gap G between the internal electrodes, Tc, L, and Lm were set to 75 μm, 1400 μm, and 100 μm, respectively, and G was varied. In this regard, flashover and capacitance test results are shown in Table 2.

The value of capacitance was set to 1000 pF. The flashover test was conducted by connecting positive (+) and negative (−) electrodes to both terminals of an MLCC, instantly applying a high voltage of 1 kV thereto, and then measuring IR, and thus the occurrence or non-occurrence of flashover was confirmed.

TABLE 2

| | Tc (μm) | L (μm) | Lm (μm) | G (μm) | 1.5Lm (μm) | L-2Lm (μm) | Occurrence or Non-occurrence of Flashover | Capacitance (pF) |
|---|---|---|---|---|---|---|---|---|
| Comparative Example 1 | 75 | 1400 | 100 | 90 | 150 | 1200 | Occurrence | 1350 |
| Comparative Example 2 | | | | 120 | 150 | 1200 | Occurrence | 1250 |
| Inventive Example 1 | | | | 150 | 150 | 1200 | Non-occurrence | 1120 |
| Inventive Example 2 | | | | 180 | 150 | 1200 | Non-occurrence | 1000 |
| Comparative Example 3 | | | | 210 | 150 | 1200 | Non-occurrence | 820 |
| Comparative Example 4 | | | | 240 | 150 | 1200 | Non-occurrence | 660 |

Referring to Table 2, when G in Comparative Examples 1 and 2 was smaller than 1.5Lm, flashover occurred but capacitances thereof were higher than a predetermined value. It was determined that flashover occurred between the first and second internal electrodes since the gap G between the first and second internal electrodes was excessively small.

When G in Inventive Examples 1 and 2 was greater than 1.5Lm but smaller than L−2Lm, flashover did not occur and capacitances thereof were higher than the predetermined value.

When G in Comparative Examples 3 and 4 was greater than L-2Lm, flashover did not occur but capacitances thereof did not reach the predetermined value. It was determined that the capacitance did not reach the predetermined value since the overlapping areas between the first and second internal electrodes and the floating electrodes were relatively small.

As a result, it can be confirmed that if $1.5Lm \leq G \leq L-2Lm$, flashover did not occur and capacitance was higher than the predetermined value.

Next, in order to confirm reliability, Tc, Te, Td, and Lm were set to 75 μm, 1.5 μm, 15 μm, and 100 μm, respectively, and L1 was varied.

The reliability test results are shown in Table 3. The reliability test was conducted by determining whether or not short circuits occurred.

Referring to Table 3, when L1 in Comparative Examples 5 to 7 was greater than $Lm+(Tc+Te+Td)\times \cot 50°$, short circuits occurred in all the comparative examples. As a result of cutting each sample and observing the cross section thereof using a high-resolution microscope, the crack penetrated the floating electrode as well as the uppermost internal electrode.

When L1 in Inventive Examples 3 and 4 was smaller than $Lm+(Tc+Te+Td)\times \cot 50°$, short circuits did not occur. As a result of cutting each sample and observing the cross section thereof, the crack penetrated the uppermost internal electrode, but did not intersect the floating electrode.

It can be confirmed in view of the above results that the uppermost internal electrode and the floating electrode were electrically connected due to the crack, resulting in degradation in reliability, and thus short circuits occurred.

Next, in order to determine an appropriate length of L2, G, Tc, Te, Td, L, and Lm were set to 150 μm, 75 μm, 1.5 μm, Td 15 μm, L 1400 μm, and Lm 100 μm, respectively, and L1 and L2 were varied.

The flashover test was conducted on the samples, and then the warpage test was conducted thereon. The results are shown in Table 4.

TABLE 3

| | Tc (μm) | Te (μm) | Td (μm) | Lm (μm) | L1 (μm) | Lm + (Tc + Td + Te) × cot50° | Occurrence or Non-occurrence of Short Circuit |
|---|---|---|---|---|---|---|---|
| Comparative Example 5 | 75 | 1.5 | 15 | 100 | 240 | 177 | Occurrence |
| Comparative Example 6 | | | | 100 | 210 | 177 | Occurrence |
| Comparative Example 7 | | | | 100 | 180 | 177 | Occurrence |
| Inventive Example 3 | | | | 100 | 150 | 177 | Non-occurrence |
| Inventive Example 4 | | | | 100 | 120 | 177 | Non-occurrence |

TABLE 4

| | Tc (μm) | L1 (μm) | L (μm) | L2 (μm) | L2/L1 | L2/L | Number of Cracks | Occurrence or Non-occurrence of Flashover |
|---|---|---|---|---|---|---|---|---|
| Inventive Example 5 | 75 | 110 | 1400 | 280 | 2.5 | 1/5 | 8/100 | Non-occurrence |
| Inventive Example 6 | | 175 | 1400 | 350 | 2.0 | 1/4 | 12/100 | Non-occurrence |
| Inventive Example 7 | | 310 | 1400 | 470 | 1.5 | 1/3 | 10/100 | Non-occurrence |
| Comparative Example 7 | | 470 | 1400 | 560 | 1.2 | 2/5 | 55/100 | Occurrence |
| Comparative Example 8 | | 560 | 1400 | 600 | 1.0 | 3/7 | 62/100 | Occurrence |

Referring to Table 4, when L2 in Inventive Examples 5 to 7 was equal to or less than ⅓ of L and was equal to or greater than 1.5 times L1, flashover did not occur between the first and second external electrodes and a crack occurrence rate was 8 to 12 per 100 samples.

When L2 in Comparative Examples 7 and 8 was greater than ⅓ of L and was less than 1.5 times L1, flashover occurred between the first and second external electrodes and the crack occurrence rate was 55 to 62 per 100 samples.

The reason for which flashover occurred in the case in which L2 was greater than ⅓ of L is that the oppositely charged first and second external electrodes were positioned excessively close to one another. The reason for which the crack occurrence rate was remarkably reduced in the case in which L2 was greater than 1.5 times L1 is that the second layer effectively absorbed the stress of the ceramic main body since the contact area between the ceramic main body and the second layer was sufficiently large.

As set forth above, according to embodiments of the present invention, the occurrence of warpage and cracks can be lowered by introducing a conductive resin layer. Further, even in the case that the warpage and cracks occur, a predetermined capacitance value can be realized by preventing cracks from passing through internal electrodes. Hereby, a multilayer ceramic electronic component having excellent reliability can be realized.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic main body having internal electrode layers and floating electrode layers laminated therein and spaced apart from each other, each internal electrode layer including internal electrodes spaced apart from each other and each floating electrode layer including floating electrodes spaced apart from each other; and
    external electrodes formed on both ends of the ceramic main body, extended to portions of upper and lower surfaces of the ceramic main body, each external electrode including a first layer including a conductive metal and a second layer formed on the first layer and including a conductive resin,
    wherein, when Tc is a thickness of a cover layer of the ceramic main body, G is a gap between the internal electrodes of the internal electrode layer, L1 is a length from either end of the ceramic main body in a length direction thereof to an end of the first layer formed on the upper or lower surface of the ceramic main body, L2 is a length from either end of the ceramic main body in the length direction thereof to an end of the second layer formed on the upper or lower surface of the ceramic main body, Te is a thickness of the internal electrode, Td is a distance between the internal electrode layer and the floating electrode layer, Lm is a length of a margin part of the floating electrode layer in the length direction thereof, and L is a length of the ceramic main body, Tc≤80 μm, $(1.5)Lm \leq G \leq (L-2Lm)$, and $L1 < Lm+(Tc+Te+Td) \times \cot 50°$ are satisfied.

2. The multilayer ceramic electronic component of claim 1, wherein the multilayer ceramic electronic component is 1005-sized or greater.

3. The multilayer ceramic electronic component of claim 1, wherein, when L2 is a length from either end of the ceramic main body in the length direction thereof to an end of the second layer formed on the upper or lower surface of the ceramic main body, $(1.5)L1 \leq L2 \leq (⅓)L$ is satisfied.

4. The multilayer ceramic electronic component of claim 1, wherein the internal electrodes and the floating electrodes have a rectangular shape.

5. The multilayer ceramic electronic component of claim 1, wherein the internal electrodes and the floating electrodes are formed of the same material.

6. The multilayer ceramic electronic component of claim 1, wherein the conductive resin includes at least one selected from the group consisting of a silver (Ag)-epoxy resin, a copper (Cu)-epoxy resin, and a copper (Cu)-coated silver (Ag) resin.

7. A multilayer ceramic electronic component, comprising:
    a ceramic main body having internal electrode layers and floating electrode layers laminated therein and spaced apart from each other, each internal electrode layer including internal electrodes spaced apart from each other and each floating electrode layer including floating electrodes spaced apart from each other; and
    external electrodes formed on both ends of the ceramic main body, extended to portions of upper and lower surfaces of the ceramic main body, each external electrode including a first layer including a conductive metal and a second layer formed on the first layer and including a conductive resin,
    wherein, when Tc is a thickness of a cover layer of the ceramic main body, G is a gap between the internal electrodes of the internal electrode layer, L1 is a length from either end of the ceramic main body in a length direction thereof to an end of the first layer formed on the upper or lower surface of the ceramic main body, L2 is a length from either end of the ceramic main body in the length direction thereof to an end of the second layer formed on the upper or lower surface of the ceramic main body, Te is a thickness of the internal electrode, Td is a distance between the internal electrode layer and the floating electrode layer, Lm is a length of a margin part of the floating electrode layer in the length direction thereof, and L is a length of the ceramic main body, $Tc \leq 80$ μm, $(1.5)Lm \leq G \leq (L-2Lm)$, $(1.5)L1 \leq L2 \leq (1/3)L$ are satisfied.

8. The multilayer ceramic electronic component of claim 7, wherein the multilayer ceramic electronic component is 1005-sized or greater.

9. The multilayer ceramic electronic component of claim 7, wherein the multilayer ceramic electronic component satisfies $L1 < Lm+(Tc+Te+Td) \times \cot 50°$.

10. The multilayer ceramic electronic component of claim 7, wherein the internal electrodes and the floating electrodes have a rectangular shape.

11. The multilayer ceramic electronic component of claim 7, wherein the internal electrodes and the floating electrodes are formed of the same material.

12. The multilayer ceramic electronic component of claim 7, wherein the conductive resin includes at least one selected from the group consisting of a silver (Ag)-epoxy resin, a copper (Cu)-epoxy resin, and a copper (Cu)-coated silver (Ag) resin.

* * * * *